(12) United States Patent
Chiba

(10) Patent No.: US 11,831,214 B2
(45) Date of Patent: Nov. 28, 2023

(54) OSCILLATORY ACTUATOR WITH LEAF SPRINGS HAVING ELASTIC MEMBER BRIDGING SPRING ARMS

(71) Applicant: FOSTER ELECTRIC COMPANY, LIMITED, Tokyo (JP)

(72) Inventor: Yusuke Chiba, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/075,343

(22) Filed: Dec. 5, 2022

(65) Prior Publication Data

US 2023/0103219 A1 Mar. 30, 2023

Related U.S. Application Data

(63) Continuation of application No. 17/045,491, filed as application No. PCT/JP2019/014805 on Apr. 3, 2019, now Pat. No. 11,563,365.

(30) Foreign Application Priority Data

Apr. 6, 2018 (JP) .................................. 2018-073932

(51) Int. Cl.
  *H02K 33/02* (2006.01)
  *B06B 1/04* (2006.01)

(52) U.S. Cl.
  CPC .............. *H02K 33/02* (2013.01); *B06B 1/045* (2013.01)

(58) Field of Classification Search
  CPC ...... H02K 35/00; H02K 35/02; H02K 11/046; H02K 7/1869; H02K 7/1876; H02K 41/02; H02K 33/00; H02K 33/02; H02K 33/04; H02J 1/00; H02N 11/00; H02N 11/002; H02N 11/04
  USPC .. 310/12, 12.12, 12.01, 12.03, 12.13, 12.16, 310/12.26, 15–29
  See application file for complete search history.

(56) References Cited

U.S. PATENT DOCUMENTS 4,412,317 A * 10/1983 Asjes ..................... G01V 1/181
                                                                367/187
6,501,357 B2 * 12/2002 Petro ..................... H02K 33/16
                                                                335/229

(Continued)

FOREIGN PATENT DOCUMENTS

EP    3855607    7/2021
EP    3932568    1/2022

*Primary Examiner* — Maged M Almawri
(74) *Attorney, Agent, or Firm* — JCIPRNET

(57) ABSTRACT

The disclosure provides an oscillatory actuator which includes a case in a cylindrical shape; an electromagnetic driver provided inside the case; a mover oscillated by the electromagnetic driver along an oscillation axis of the case; and a first leaf spring and a second leaf spring arranged on one side and the other side with the mover interposed therebetween, each of the first leaf spring and the second leaf spring including a support to which the mover is attached, an annular frame attached to an inner surface of the case, and a plurality of arms each having a spiral shape and connecting the support and the annular frame, wherein at least one of the first leaf spring and the second leaf spring is provided with an elastic member which is made of an elastic material that bridges the arm and a portion adjacent to the arm with a gap.

6 Claims, 19 Drawing Sheets

(56) References Cited

U.S. PATENT DOCUMENTS

| | | | | |
|---|---|---|---|---|
| 6,983,923 B2* | 1/2006 | Fukui | F16K 31/082 | 335/229 |
| 7,078,832 B2* | 7/2006 | Inagaki | H02K 7/14 | 335/238 |
| 7,449,803 B2* | 11/2008 | Sahyoun | H02K 33/16 | 310/23 |
| 7,586,220 B2* | 9/2009 | Roberts | H02K 1/34 | 290/1 R |
| 7,671,493 B2* | 3/2010 | Takashima | G06F 3/016 | 310/15 |
| 7,791,456 B2* | 9/2010 | Miura | B06B 1/045 | 340/407.1 |
| 7,911,098 B2* | 3/2011 | Lee | H02K 33/16 | 310/20 |
| 8,013,480 B2* | 9/2011 | Bang | B06B 1/045 | 310/12.33 |
| 8,097,991 B2* | 1/2012 | Masami | H02K 33/16 | 310/15 |
| 8,188,623 B2* | 5/2012 | Park | H02K 33/16 | 310/12.01 |
| 8,278,786 B2* | 10/2012 | Woo | H02K 33/16 | 310/15 |
| 8,288,899 B2* | 10/2012 | Park | H02K 33/16 | 310/71 |
| 8,575,794 B2* | 11/2013 | Lee | H02K 33/18 | 310/15 |
| 8,736,086 B2* | 5/2014 | Yang | H02K 35/02 | 290/1 R |
| 9,461,530 B2* | 10/2016 | Wasenczuk | B06B 1/04 | |
| 9,562,525 B2* | 2/2017 | Hahn | F04B 35/045 | |
| 9,695,806 B2* | 7/2017 | Van Brunt | H02K 33/16 | |
| 9,815,085 B2* | 11/2017 | Chun | G06F 3/016 | |
| 9,906,109 B2* | 2/2018 | Endo | H02K 33/16 | |
| 10,079,531 B2* | 9/2018 | Xu | H02K 5/04 | |
| 10,307,791 B2* | 6/2019 | Xu | B06B 1/045 | |
| 10,328,461 B2* | 6/2019 | Xu | B06B 1/045 | |
| 10,486,196 B2* | 11/2019 | Chai | B06B 1/045 | |
| 10,710,115 B2* | 7/2020 | Huang | H02K 33/02 | |
| 11,418,099 B2* | 8/2022 | Takahashi | H02K 33/06 | |
| 2004/0119343 A1* | 6/2004 | Ueda | G10K 9/18 | 310/12.31 |
| 2005/0225181 A1* | 10/2005 | Tu | H02K 35/00 | 310/15 |
| 2006/0002577 A1* | 1/2006 | Won | B06B 1/045 | 381/396 |
| 2006/0124083 A1* | 6/2006 | Niiyama | F02B 63/04 | 123/46 R |
| 2007/0052302 A1* | 3/2007 | Cheung | B82Y 25/00 | 310/12.25 |
| 2007/0085425 A1* | 4/2007 | Hirashima | H02K 33/16 | 310/15 |
| 2007/0182257 A1* | 8/2007 | Miura | H04R 9/02 | 310/23 |
| 2009/0250032 A1* | 10/2009 | Fullerton | H03K 3/45 | 123/143 B |
| 2011/0018364 A1* | 1/2011 | Kim | H02K 33/18 | 310/20 |
| 2011/0018365 A1* | 1/2011 | Kim | B06B 1/045 | 310/20 |
| 2011/0062803 A1* | 3/2011 | Lee | H02K 33/18 | 310/29 |
| 2011/0068640 A1* | 3/2011 | Choi | H02K 5/04 | 310/25 |
| 2011/0089773 A1* | 4/2011 | Choi | H02K 33/16 | 310/25 |
| 2011/0133577 A1* | 6/2011 | Lee | H02K 33/18 | 310/15 |
| 2011/0193426 A1* | 8/2011 | Chung | H02K 33/16 | 310/25 |
| 2011/0198948 A1* | 8/2011 | Keisuke | H02K 5/225 | 310/25 |
| 2011/0198949 A1* | 8/2011 | Furuich | H02K 33/16 | 310/25 |
| 2011/0266892 A1* | 11/2011 | Wauke | H02K 33/18 | 310/25 |
| 2011/0291497 A1* | 12/2011 | Choi | H02K 33/18 | 310/25 |
| 2012/0032535 A1* | 2/2012 | Park | H02K 35/02 | 310/25 |
| 2012/0098380 A1* | 4/2012 | Wang | H02K 15/0442 | 310/260 |
| 2012/0146557 A1* | 6/2012 | Pyo | H02P 31/00 | 310/25 |
| 2012/0169148 A1* | 7/2012 | Kim | H02K 33/16 | 310/25 |
| 2012/0293022 A1* | 11/2012 | Park | B06B 1/045 | 310/25 |
| 2013/0033128 A1* | 2/2013 | Yoon | H02K 33/18 | 310/25 |
| 2013/0033129 A1* | 2/2013 | Hong | B06B 1/045 | 310/25 |
| 2013/0043766 A1* | 2/2013 | Takahashi | H04R 17/00 | 310/326 |
| 2013/0099600 A1* | 4/2013 | Park | B06B 1/045 | 310/15 |
| 2013/0285479 A1* | 10/2013 | Kinoshita | H02K 35/02 | 310/12.12 |
| 2014/0062225 A1* | 3/2014 | Kim | H02K 33/00 | 310/15 |
| 2014/0103751 A1* | 4/2014 | Furukawa | H02K 35/02 | 310/25 |
| 2014/0132089 A1* | 5/2014 | Jeon | H02K 33/18 | 310/14 |
| 2014/0241911 A1* | 8/2014 | Roman | F04B 39/1073 | 417/328 |
| 2014/0265651 A1* | 9/2014 | Kim | H02K 33/16 | 310/25 |
| 2015/0194870 A1* | 7/2015 | Kim | H02K 33/18 | 310/25 |
| 2015/0226197 A1* | 8/2015 | Hahn | F04B 39/122 | 417/363 |
| 2016/0126821 A1* | 5/2016 | Iwaki | H02K 7/08 | 310/12.21 |
| 2016/0149517 A1* | 5/2016 | Choi | H02N 1/04 | 427/58 |
| 2016/0149518 A1* | 5/2016 | Wang | F03B 13/14 | 310/310 |
| 2016/0190903 A1* | 6/2016 | Ohishi | H02K 35/04 | 310/28 |
| 2017/0033653 A1* | 2/2017 | Wang | H02K 33/16 | |
| 2017/0033673 A1* | 2/2017 | Wang | H02K 33/16 | |
| 2017/0288523 A1* | 10/2017 | Katada | H02P 25/032 | |
| 2017/0346376 A1* | 11/2017 | Kim | H02K 15/02 | |
| 2018/0026514 A1* | 1/2018 | Mao | H02K 5/225 | 310/12.16 |
| 2018/0297074 A1* | 10/2018 | Huang | B06B 1/045 | |
| 2021/0028679 A1* | 1/2021 | Wasenczuk | H02K 1/34 | |

* cited by examiner

OSCILLATORY ACTUATOR WITH LEAF SPRINGS HAVING ELASTIC MEMBER BRIDGING SPRING ARMS

CROSS-REFERENCE TO RELATED APPLICATION

This application is a continuation of U.S. application Ser. No. 17/045,491 which is now pending and is a 371 application of the International PCT application serial no. PCT/JP2019/014805, filed on Apr. 3, 2019, which claims the priority benefits of Japan Patent Application No. 2018-073932, filed on Apr. 6, 2018. The entirety of each of the above-mentioned patent applications is hereby incorporated by reference herein and made a part of this specification.

TECHNICAL FIELD

The present disclosure relates to an oscillatory actuator, and more particularly to an oscillatory actuator with a heavy mover.

BACKGROUND ART

Conventionally, as a haptic interface for realizing a virtual reality, a method of obtaining oscillation by rotating an eccentric mass by a rotary motor has been used.

However, the conventional method utilizing the rotary motor generates oscillation by an inertial force of the eccentric mass, and it had a disadvantage such as the reaction is slow from the beginning of rotation of the eccentric mass to a moment when the oscillation is obtained as the haptic sensation, and the reality is impaired.

Therefore, it has been studied to use a voice coil actuator as an actuator for obtaining a more realistic haptic sensation.

In an oscillatory actuator with a mover of a movable magnet type, a plurality of dampers (leaf springs) is used to support the reciprocating mover. Further, in order to increase the oscillation force, a weight may be added to the mover (see, for example, Japanese Patent No. 5537984).

Then, large oscillation outputs are obtained at natural resonance frequencies derived from the spring components of the weight and the dampers.

SUMMARY OF INVENTION

Technical Problem

However, assembly and component variations may cause a non-uniform magnetic field inside the oscillatory actuator and may generate the torsional resonance at the dampers, which generates a large oscillation at other than the natural resonance frequency.

An embodiment of the present invention has been made in view of the above problems, and an objective is to provide an oscillatory actuator capable of suppressing large oscillations at other than the natural resonance frequency, further having small changes in the natural resonance frequencies, and providing sufficient oscillation outputs.

Solution to the Problems

An oscillatory actuator according to a first aspect of the present invention that solves the problem includes:
a case in a cylindrical shape;
an electromagnetic driver provided inside the case;
a mover oscillated by the electromagnetic driver along an oscillation axis of the case; and
a first leaf spring and a second leaf spring arranged on one side and the other side of the mover, each of the first leaf spring and the second leaf spring including a support to which the mover is attached, an annular frame attached to an inner surface of the case, and a plurality of arms each having a spiral shape and connecting the support and the annular frame,
wherein at least one of the first leaf spring and the second leaf spring is provided with an elastic member which is made of an elastic material that bridges the arm and a portion adjacent to the arm with a gap.

Other features of the embodiment of the present invention will become more apparent from the following embodiments of the invention and the accompanying drawings.

Advantageous Effects of Invention

By providing the elastic member that bridges the adjacent arms of the first leaf spring and the second leaf spring, the torsional resonance of the leaf springs is reduced, and large oscillation at a frequency other than the natural resonance frequencies is not generated. In addition, since the elastic member bridges the arms, changes in the natural resonance frequencies of the first leaf spring and second leaf spring are small, and it is possible to obtain sufficient oscillation outputs.

Other advantages of the embodiment of the present invention will become more apparent from the following embodiments of the invention and the accompanying drawings.

BRIEF DESCRIPTION OF DRAWINGS

FIG. 1 is assembled.

DESCRIPTION OF EMBODIMENTS

Figure 1:
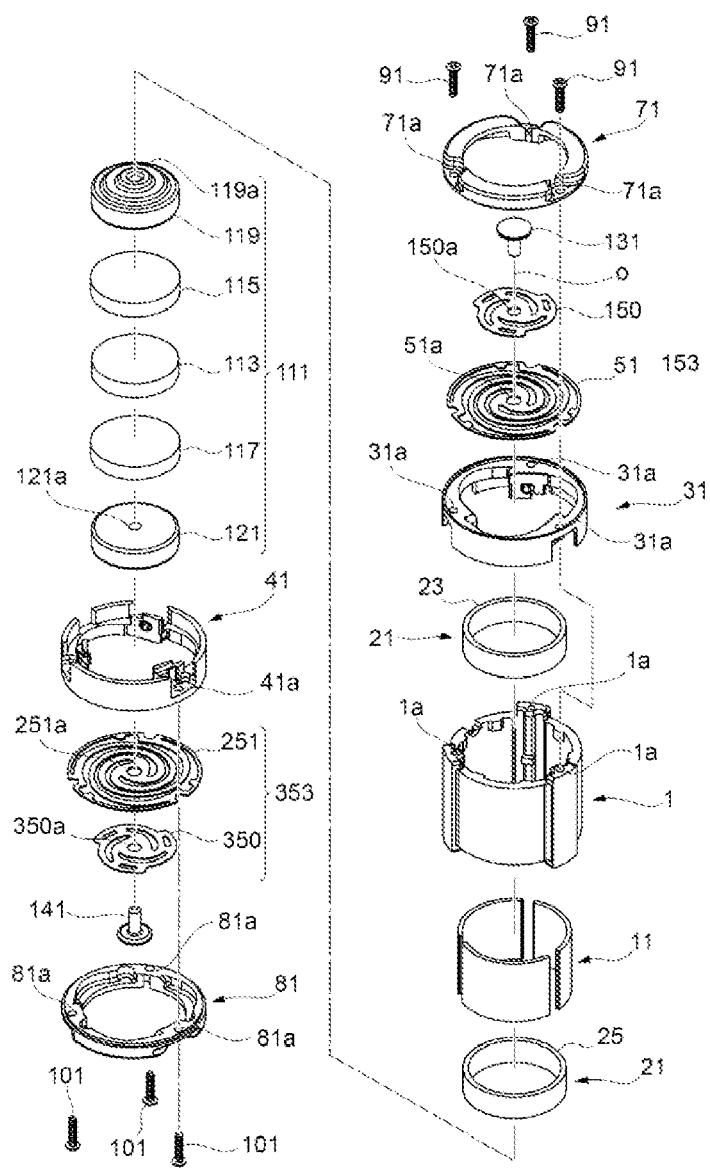
FIG. 1 is an exploded perspective view illustrating an embodiment of the oscillatory actuator according to the present invention.
Figure 2:
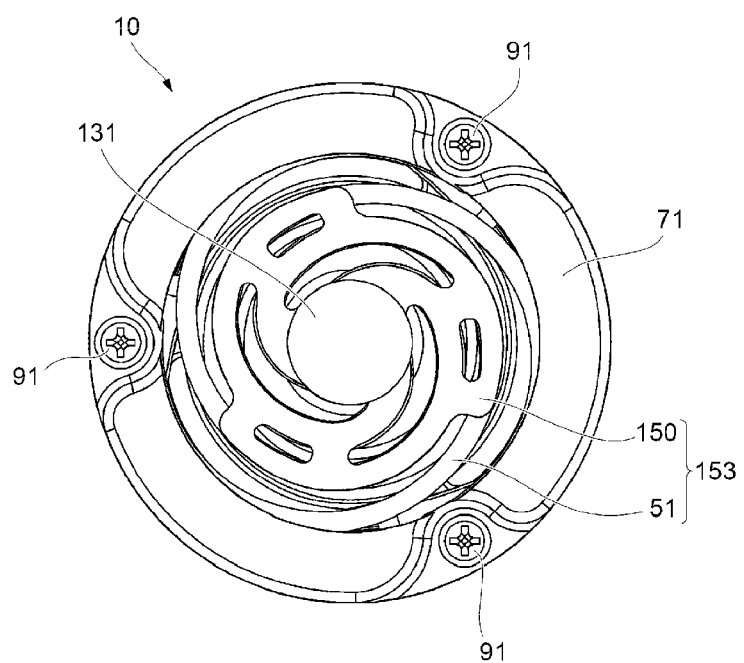
FIG. 2 is a top view when
Figure 3:
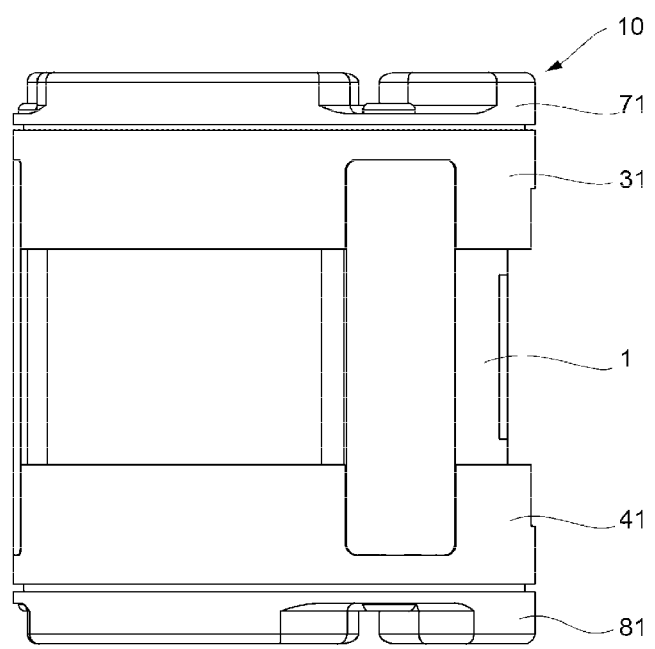
FIG. 3 is a front view of FIG. 2.
Figure 4:
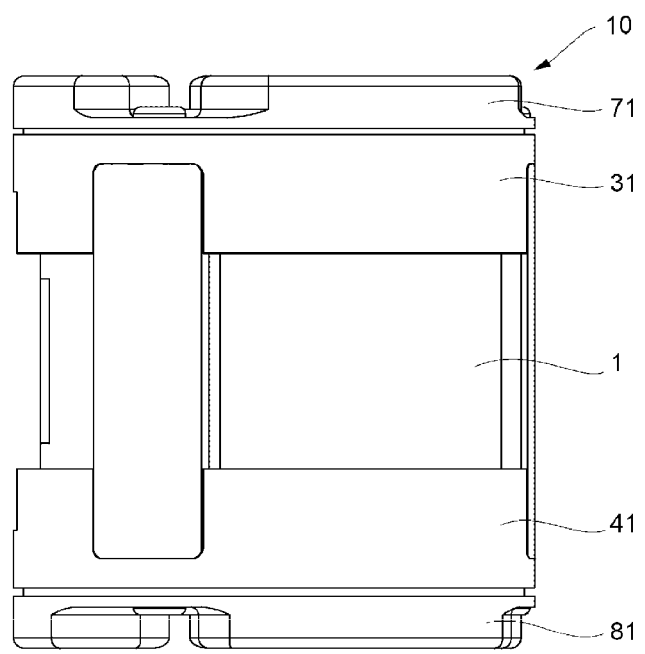
FIG. 4 is a rear view of FIG. 2.
Figure 5:
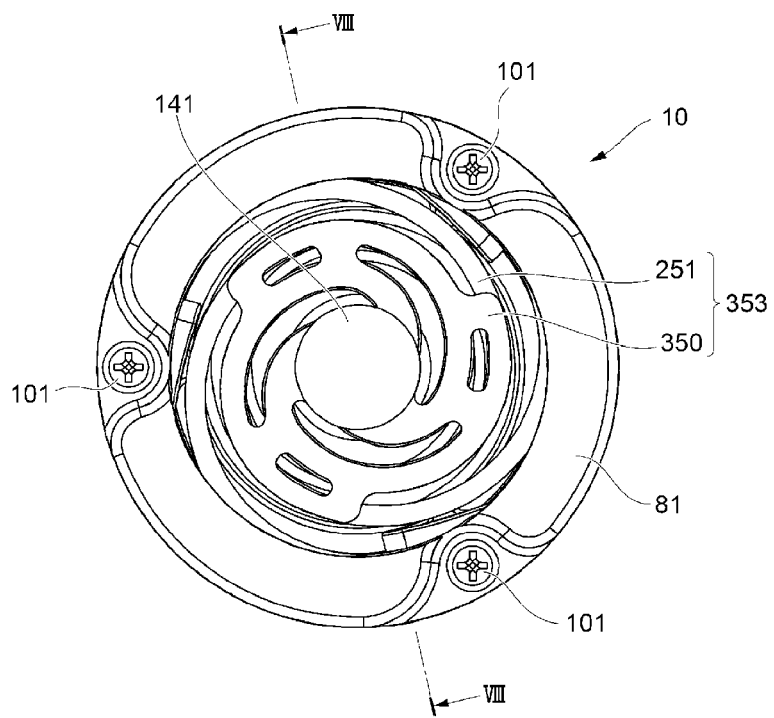
FIG. 5 is a bottom view of FIG. 2.
Figure 6:
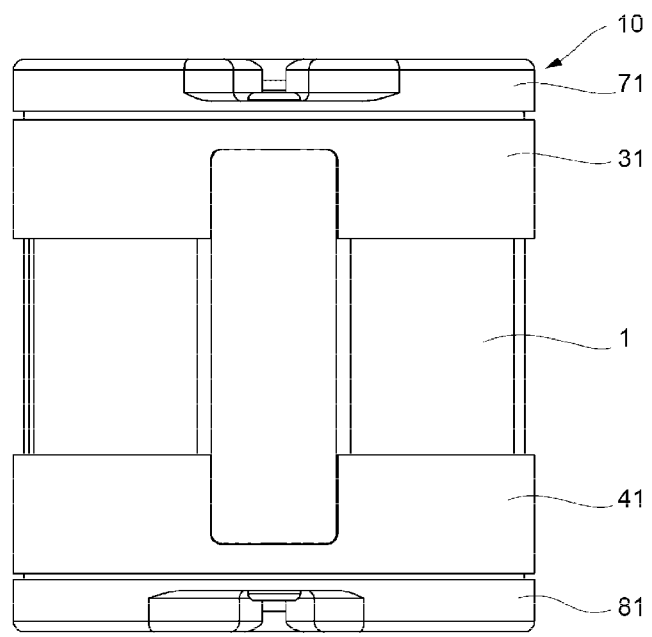
FIG. 6 is a left side view of FIG. 3.
Figure 7:
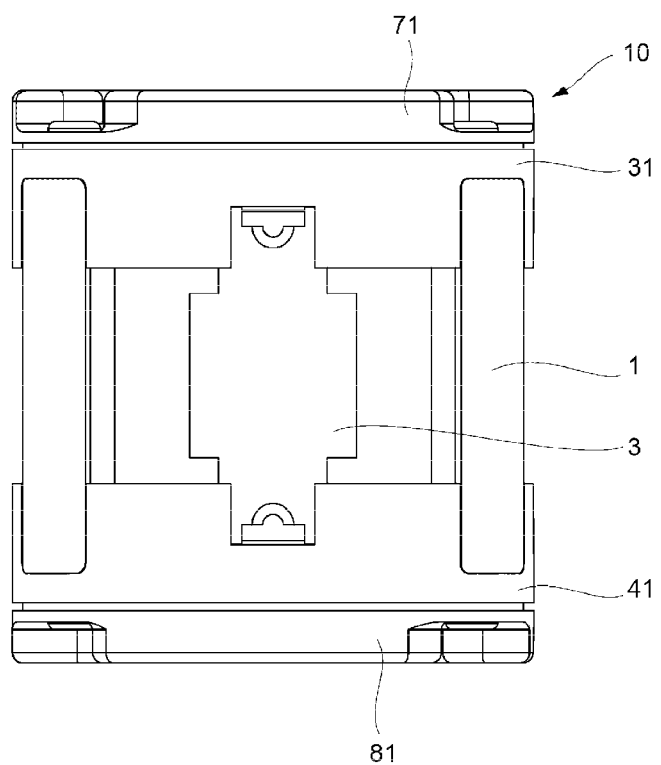
FIG. 7 is a right side view of FIG. 3.
Figure 8:
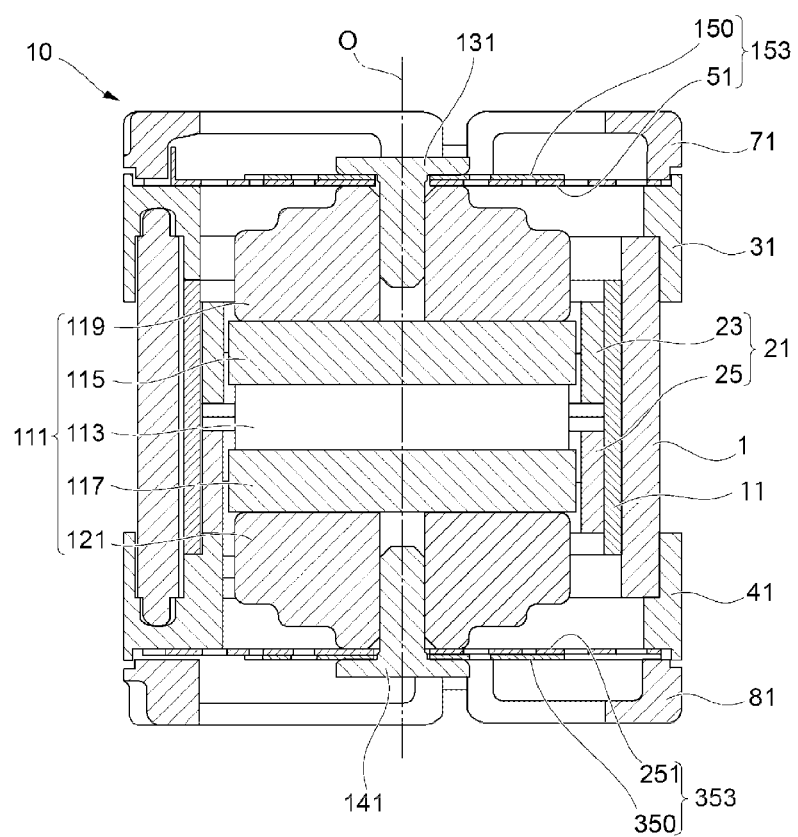
FIG. 8 is a cross-sectional view taken along line VIII-VIII of FIG. 5.
Figure 9:
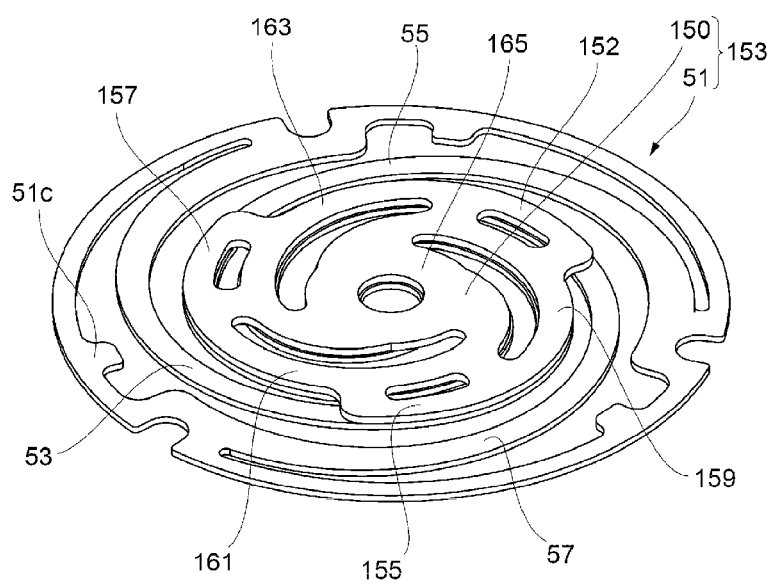
FIG. 9 is a perspective view of a first damper unit including a first damper of FIG. 1 on which a first elastic member is provided.
Figure 10:
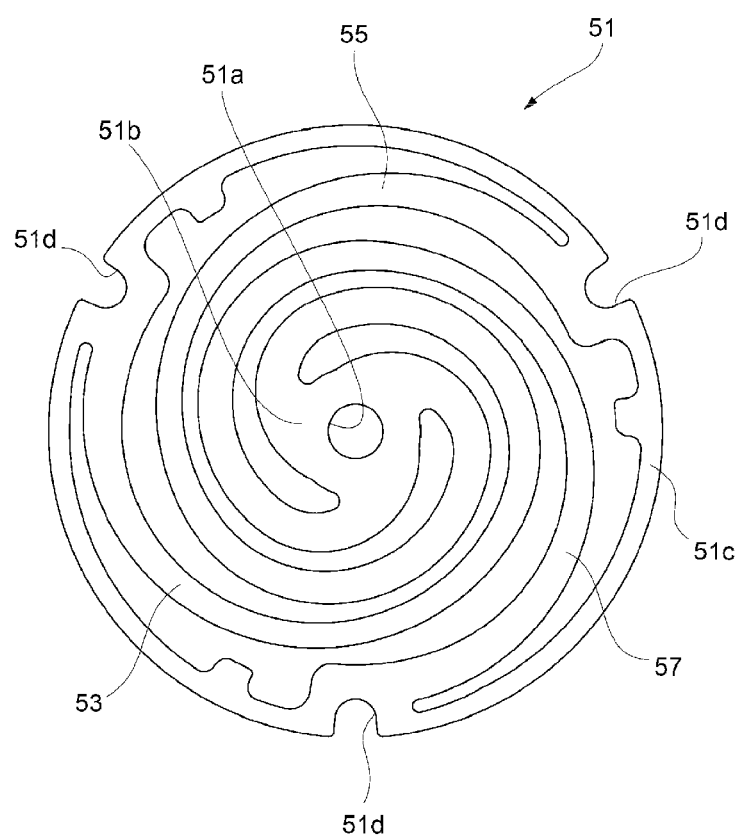
FIG. 10 is a top view of the first damper of FIG. 9.
Figure 11:
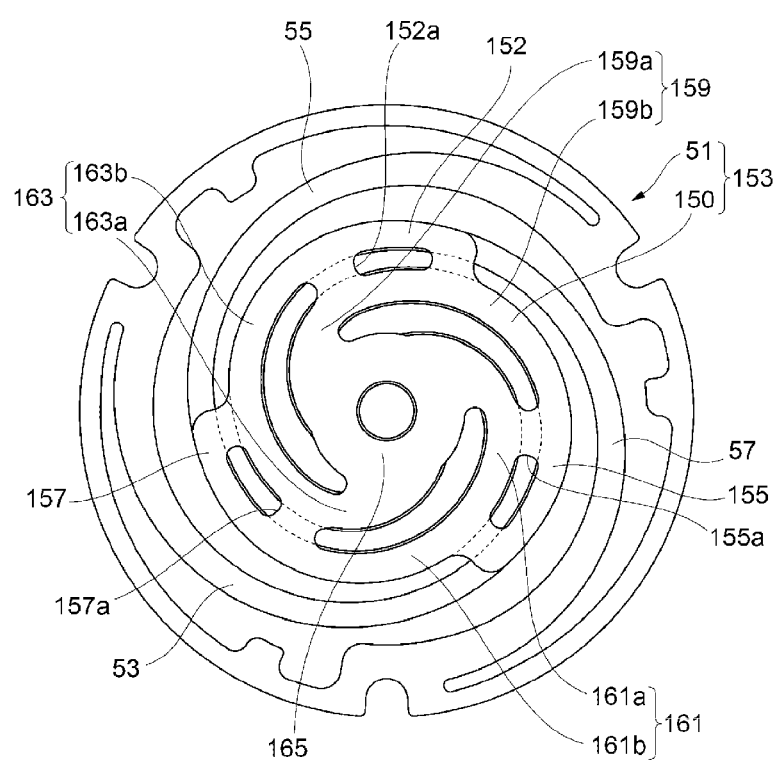
FIG. 11 is a front view of the first damper unit of FIG. 9.
Figure 12:
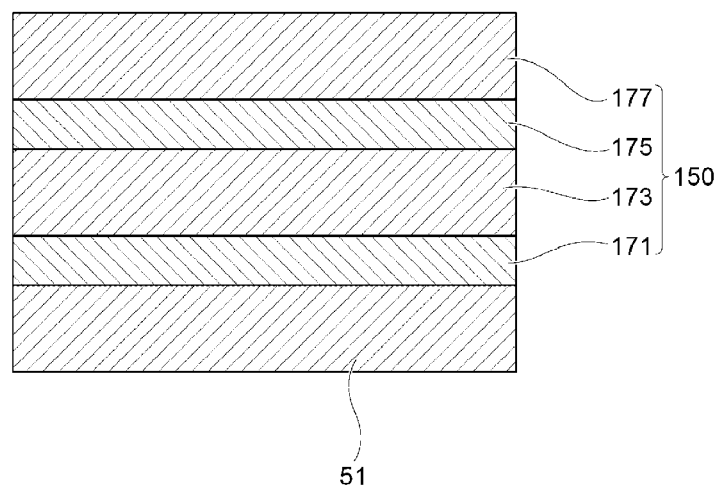
FIG. 12 is a configuration diagram illustrating a structure of the first elastic member of FIG. 1.
Figure 13:
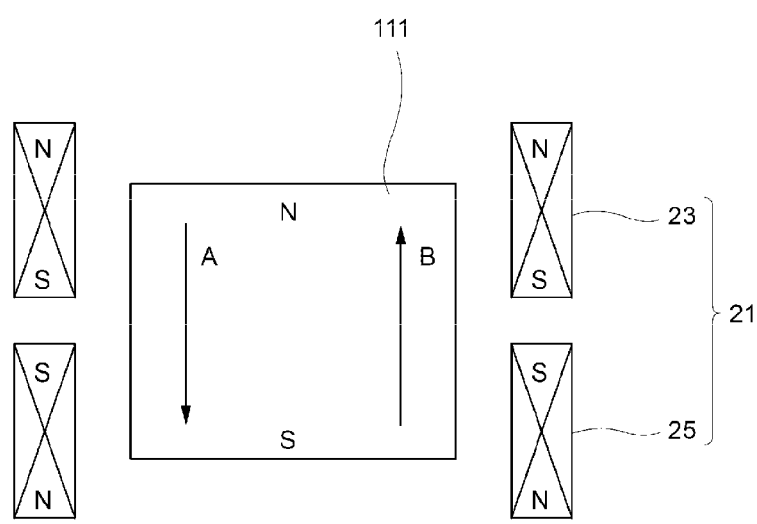
FIG. 13 illustrates an operation of the oscillatory actuator shown in FIG. 1.
Figure 14:
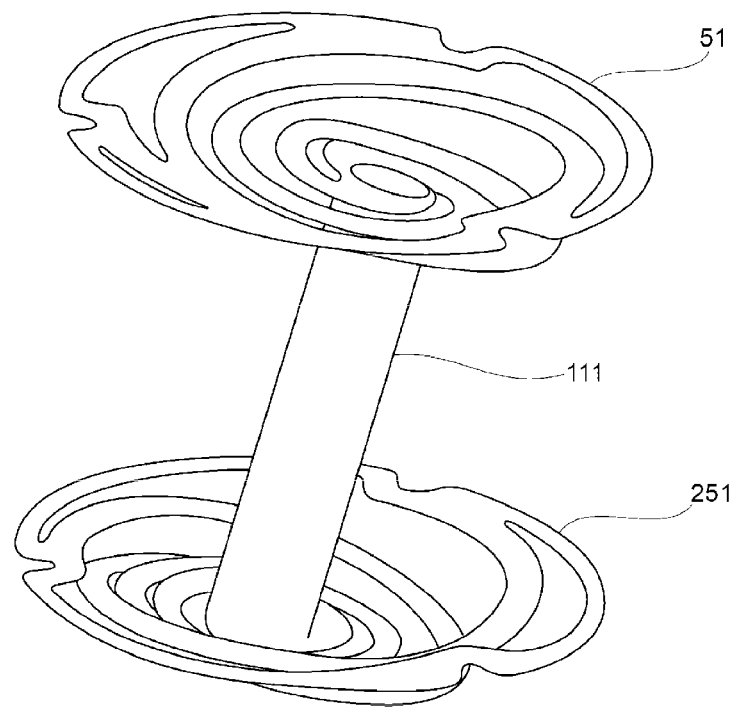
FIG. 14 illustrates torsional resonance of first elastic damper and second elastic damper shown in FIG. 1.
Figure 15:
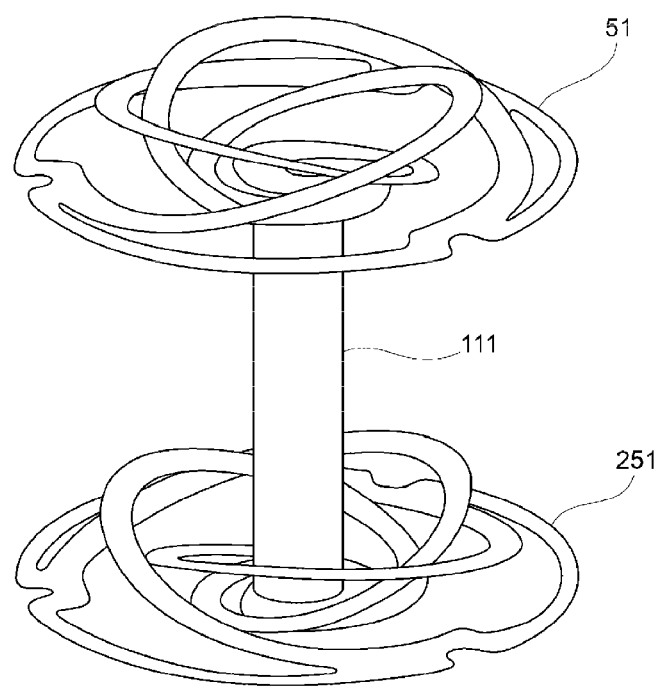
FIG. 15 illustrates resonance of arms of the first elastic damper and second elastic damper shown in FIG. 1.

Embodiments will be described with reference to the drawings. FIG. 1 is an exploded perspective view illustrating an embodiment of the oscillatory actuator according to the present invention. FIG. 2 is a top view when FIG. 1 is assembled. FIG. 3 is a front view of FIG. 2. FIG. 4 is a rear view of FIG. 2. FIG. 5 is a bottom view of FIG. 2. FIG. 6 is a left side view of FIG. 3. FIG. 7 is a right side view of FIG. 3. FIG. 8 is a cross-sectional view taken along line VIII-VIII of FIG. 5. FIG. 9 is a perspective view of a damper unit including a first leaf spring of FIG. 1 on which an elastic member is provided. FIG. 10 is a top view of FIG. 9. FIG. 11 is a front view of FIG. 10. FIG. 12 is a configuration diagram illustrating a structure of the first elastic member of FIG. 1. FIG. 13 illustrates an operation of the oscillatory actuator shown in FIG. 1. FIG. 14 illustrates torsional resonance of first elastic damper and second elastic damper shown in FIG. 1. FIG. 15 illustrates resonance of arms of the first elastic damper and second elastic damper shown in FIG. 1.

(Overall Configuration)

An overall configuration of an oscillatory actuator 10 will be described with reference to FIGS. 1 to 8.

A case 1 is in a cylindrical shape with openings at both ends and made of a resin such as ABS. A yoke 11 in a cylindrical shape and made of a soft magnetic material is located inside the case 1. A coil 21 is attached to an inner circumferential surface of the yoke 11 in a state of being electrically insulated from the yoke 11.

A first cover case 31 in a cylindrical shape and made of a resin such as ABS is located on an end surface at one opening side of the case 1. A second cover case 41 in a cylindrical shape and made of a resin such as ABS is located on an end surface at the other opening side of the case 1.

A first damper unit 153 is located on an end surface of the first cover case 31 on the opening side opposite to the case 1. The first damper unit 153 is formed by processing a thin plate of stainless steel (e.g., SUS 304 in this embodiment) and includes a first damper 51 that is a leaf spring flexible along the oscillation axis O of the case 1 and a first elastic member 150 provided on the first damper 51.

A second damper unit 353 is located on the end surface of the second cover case 41 on the opening side opposite to the case 1. The second damper unit 353 is formed by processing a thin plate of stainless steel and includes a second damper 251 that is a leaf spring flexible along the oscillation axis O of the case 1 and a second elastic member 350 provided on the second damper 251.

The details of the first damper unit 153 and second damper unit and 353 will be described later.

A first damper cover 71 is located to interpose the first damper unit 153 therebetween in cooperation with the first cover case 31. A second damper cover 81 is located to interpose the second damper unit 353 therebetween in cooperation with the second cover case 41.

Three through-holes 71a are formed at a pitch of 120° along the edge of the first damper cover 71. The first cover case 31 has three through-holes 31a facing the holes 71a of the first damper cover 71. Three screw holes 1a facing the three holes 31a of the first cover case 31 are formed on the end surface on one opening side of the case 1.

Then, three screws 91 are inserted through the holes 71a of the first damper cover 71 and the holes 31a of the first cover case 31 and screwed into the screw holes 1a of the case 1. With the circumferential edge of the first damper 51 interposed between the first damper cover 71 and the first cover case 31, the first damper cover 71, the first damper unit 153, and the first cover case 31 are attached to the one opening side of the case 1 by the three screws 91.

Three through-holes 81a are formed at a pitch of 120° along the edge of the second damper cover 81. The second cover case 41 has three through-holes 41a facing the holes 81a of the second damper cover 81. Three screw holes (not shown) facing the three holes 41a of the second cover case 41 are formed on the end surface on the other opening side of the case 1.

Then, three screws 101 are inserted through the holes 81a of the second damper cover 81 and the holes 41a of the second cover case 41 and screwed into the screw holes formed in the end surface of the other opening side of the case 1. With the circumferential edge of the second damper 251 interposed between the second damper cover 81 and the second cover case 41, the second damper cover 81, the second damper unit 353, and the second cover case 41 are attached to the other opening side of the case 1 by the three screws 101.

A mover 111, which is surrounded by the coil 21 and oscillates along the oscillation axis O, is interposed between the first and second damper units 153 and 353. The mover 111 includes a magnet 113 in the shape of a disk, a first pole piece 115 and a second pole piece 117 each in the shape of a disk and arranged so as to interpose the magnet 113 therebetween, and a first mass (weights) 119 and a second mass (weights) 121 arranged so as to interpose the magnet 113 and the first pole piece 115 and the second pole piece 117 therebetween.

The magnetizing direction of the magnet 113 is the oscillation axis O direction. The first pole piece 115 and the second pole piece 117 are made of a soft magnetic material and attached to the magnet 113 by a magnetic attraction force of the magnet 113 and an adhesive, or the like. The first mass 119 and the second mass 121 are made of a non-magnetic material and are attached to the first pole piece 115 and the second pole piece 117 by an adhesive, or the like. Accordingly, the magnet 113, the first pole piece 115, the second pole piece 117, the first mass 119, and the second mass 121, which constitute the mover 111, are integrated.

A through-hole 119a and a through-hole 121a penetrating along the central axis are formed on the first mass 119 and the second mass 121. Further, at the center of the first damper 51 and the first elastic member 150, a through-hole 51a and a through-hole 150a facing the hole 119a of the first mass 119 are formed. Similarly, at the center of the second damper 251 and the second elastic member 350 a through-hole 251a and a through-hole 350a facing the hole 121a of the second mass 121 are formed.

Then, by inserting a pin 131 into the hole 51a of the first damper 51 and the hole 150a of the first elastic member 150 and press-fitting the pin into the hole 119a of the first mass 119, Inserting a pin 141 into the hole 251a of the second damper 251 and the hole 350a of the second elastic member 350 and press-fitting the pin into the hole 121a of the second mass 121, the mover 111 is oscillatably supported along the oscillation axis O of the case 1.

A terminal 3 is formed on the circumferential surface of the case 1, and to which a lead wire is connected and supplies currents to the coil 21. (Coil 21)

The coil 21 will be described with reference to FIGS. 1 to 8.

The coil 21 according to this embodiment is located along the oscillation axis O, and includes a first coil 23 and a second coil 25. The first coil 23 and the second coil 25 are wound along the inner circumferential surface of the yoke 11.

In this manner, inside the case 1, the first coil 23 and the second coil 25 provided on the case 1 side and the magnet 113 provided in the mover 111 side constitute an electromagnetic driver of the oscillatory actuator 10. The mover 111 oscillates along the oscillation axis O of the case 1 due to the electromagnetic action of the electromagnetic driver which will be described later with reference to FIG. 13.

(First Damper Unit 153 and Second Damper Unit 353)

The first damper unit 153 and second damper unit 353 according to this embodiment will be described in more detail with reference to FIGS. 9 to 11. Since the first damper unit 153 and second damper unit 353 are in the same shape and attached to the case 1 in the same manner, only the first damper unit 153 will be described here and the description of the second damper unit 353 will be omitted. Then, the same portion of the second damper unit 353 as the first damper unit 153 are labeled with reference numerals obtained by adding 200 to the reference numerals of the corresponding components of the first damper unit 153. For example, when a first arm of the first damper 51 of the first damper unit 153 is labeled with reference numeral 53, the reference numeral of a first arm of the second damper 251 of the second damper unit 353 is 253.

At the center of the first damper 51, which is one of the two components constituting the first damper unit 153, a support 51b attached to the mover 111 using the pin 131 that passes through the hole 51a is formed.

An annular frame 51c of the first damper 51 is held between the first damper cover 71 and the first cover case 31 and attached to the case 1. Three cutouts 51d are formed on this annular frame 51c of the first damper 51 in order to avoid interference with the screws 91.

Then, the support 51b and the annular frame 51c are connected together by three arms such as a first arm 53, a second arm 55, and a third arm 57 having the same spiral shape. The first arm 53, the second arm 55, and the third arm 57 are arranged at a pitch of 120° around the oscillation axis O.

The second damper 251 also has this configuration.

The first elastic member 150, which is the other component constituting the first damper unit 153, has bridges that bridge the adjacent arms of the first damper 51. That is, a first bridge 152 bridges the first arm 53 and the third arms 57 of the first damper 51, a second bridge 155 bridges the second arm 55 and the first arm 53, and a third bridge 157 bridges the third arm 57 and the second arm 55. The first bridge 152, the second bridge 155, and the third bridge 157 according to this embodiment have a hole 152a, a hole 155, and a hole 157a, respectively.

Accordingly, the first bridge 152 bridges the first arm 53 and third arm 57 in two positions via the hole 152a. The second bridge 155 bridges the second arm 55 and first arm 53 in two positions via the hole 155a. The third bridge 157 bridges the third arm 57 and second arm 55 in two positions via the hole 157a.

In addition, the first elastic member 150 has a first stacked arm 159 that is connected to the first bridge 152, extends along the first arm 53, and is overlapped with the first arm 53. This first stacked arm 159 includes a first support-direction stacked arm 159a extending in the support 51b direction and a first annular-frame-direction stacked arm 159b extending in the annular-frame 51c direction and connecting to the second bridge 155.

Further, the first elastic member 150 has a second stacked arm 161 that is connected to the second bridge 155, extends along the second arm 55, and is overlapped with the second arm 55. This second stacked arm 161 includes a second support-direction stacked arm 161a extending in the support 51b direction and a second annular-frame-direction stacked arm 161b extending in the annular frame 51c direction and connecting to the third bridge 157.

Furthermore, the first elastic member 150 has a third stacked arm 163 that is connected to the third bridge 157, extends along the third arm 57, and is overlapped with the third arm 57. This third stacked arm 163 includes a third support-direction stacked arm 163a extending in the support 51b direction and a third annular-frame-direction stacked arm 163b extending in the annular frame 51c direction and connecting to the first bridge 152.

Then, the first elastic member 150 includes a stacked support 165 overlapped with the support 51b in which the first support-direction stacked arm 159a, the second support direction stacked arm 161a, and the third support-direction stacked arm 163a are continuously provided.

The second elastic member 350 also has this configuration.

(Structures of First Elastic Member 150 and Second Elastic Member 350)

The first elastic member 150 and the second elastic members 350 will be described with reference to FIG. 12. Since the first elastic member 150 and the second elastic member 350 according to this embodiment have the same structure, the description of the second elastic member 350 will be omitted.

As shown in FIG. 12, the first elastic member 150 includes, stacking on the first damper 51, a first adhesive layer 171 made of an adhesive, a PE layer 173 made of polyethylene (PE), a second adhesive layer 175 made of an adhesive, and an elastomer layer 177 made of elastomer which may be, but not limited to, a thermoplastic polyurethane elastomer (TPU). Then, the elastic deformations of the first elastic member 150 (i.e., the shear deformation of the PE layer 173 and the bending deformation of the elastomer layer 177 in this embodiment) control the oscillation of the first damper 51.

The second elastic member 350 also has this structure.

(Operation)

An operation of the oscillatory actuator 10 according to this embodiment will be described with reference to FIG. 13.

When the first coil 23 and the second coil 25 are not energized, the mover 111 supported by the first damper unit 153 and the second damper unit 353 is located at the center of the coil 21.

The first coil 23 and the second coil 25 are alternately energized with alternating currents in directions in which magnetic fields with opposite polarities occurs. That is, the same polarity is generated between adjacent portions of the first coil 23 and the second coil 25.

At the polarities of FIG. 13, a downward thrust (i.e., in the direction of arrow A) is generated on the mover 111, when the currents flowing to the first coil 23 and the second coil 25 are inverted, an upward thrust (i.e., the direction of arrow B) is generated on the mover.

In this way, when alternating currents are applied to the first coil 23 and the second coil 25, the mover 111 oscillates along the oscillation axis O while receiving the biasing force by the first damper unit 153 and second damper unit 353 from both sides.

By the way, the thrust generated in the mover 111 is basically based on the thrust given based on the Fleming's left-hand rule. In this embodiment, since the first coil 23 and the second coil 25 are fixed, a thrust as the reaction forces to the forces generated in the first coil 23 and the second coil 25 in generated in the mover 111.

Therefore, it is a horizontal component (i.e., a component orthogonal to the axis direction of the magnet 113) of the magnetic flux of the magnet 113 of the mover 111 that contributes to the thrust. Then, the yoke 11 increases the horizontal component of the magnetic flux of the magnet 113.

According to the above configuration, the following effects can be obtained.

(1) The first elastic member 150 has the bridges that bridge the adjacent arms of the first damper 51, namely, the first bridge 152 that bridges the first arm 53 and the third arms 57, the second bridge 155 that bridges the second arm 55 and the first arm 53, and the third bridge 157 that bridges the third arm 57 and the second arm 55.

The second elastic member 350 has the bridges that bridge the adjacent arms of the second damper 251, namely, the first bridge 352 that bridges the first arm 253 and the third arm 257, the second bridge 355 that bridges the second arm 255 and the first arm 253, and the third bridge 357 that bridges the third arm 257 and second arm 255.

Therefore, the resonance caused by the torsion of the first damper 51 and second damper 251 is suppressed. In addition, the influences on the amplitude at the natural resonance frequencies can be reduced and a sufficient oscillation output can be obtained. The resonance caused by the torsion of the first damper 51 and second damper 251 means, as shown in FIG. 14, a resonance in the state that the mover 111 is off-axis (tilted) due to assembly and component variations in which the magnetic field inside the actuator becomes non-uniform and the distance between the adjacent arms of the first damper 51 and the second damper 251 changes.

(2) The first elastic member 150 has the first stacked arm 159 that is connected to the first bridge 152, extends along the first arm 53, and is overlapped with the first arm 53, the second stacked arm 161 that is connected to the second bridge 155, extends along the second arm 55, and is overlapped with the second arm 55, and the third stacked arm 163 that is connected to the third bridge 157, extends along the third arm 57, and is overlapped with the third arm 57. Each of the stacked arms extends in the support 51*b* direction as well as extending in the annular frame 51*c* direction and is connected to the other bridges.

The second elastic member 350 has the first stacked arm 359 that is connected to the first bridge 352, extends along the first arm 253, and is overlapped with the first arm 253, the second stacked arm 361 that is connected to the second bridge 355, extends along the second arm 255, and is overlapped with the second arm 255, and the third stacked arm 363 that is connected to the third bridge 357, extends along the third arm 257, and is overlapped with the third arm 257. Each of the stacked arms extends in the support 251*b* direction as well as extending in the annular frame 251*c* direction and is connected to the other bridges.

Therefore, it is possible to suppress the resonance of each arm itself of the first damper 51 and the second damper 251 as shown in FIG. 15.

The embodiments of the present invention are not limited to the above embodiment. The following modification examples are also possible.

Figure 16:
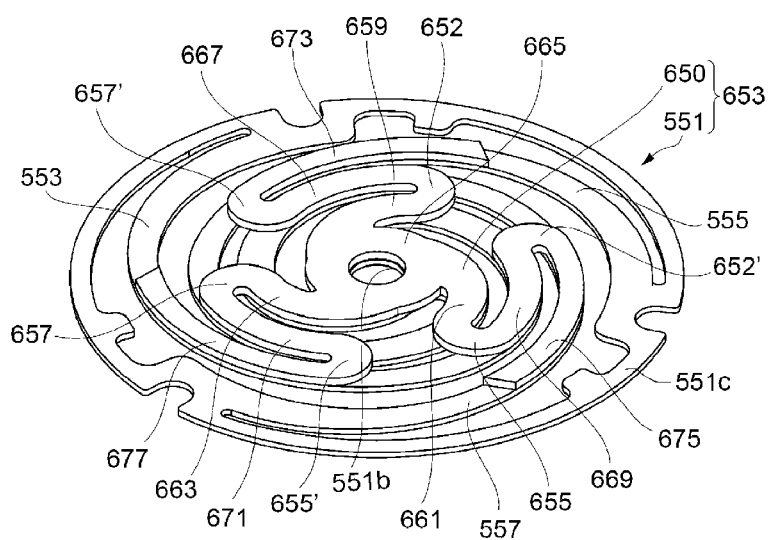
FIG. 16 is a perspective view of the first damper unit including the first damper of FIG. 1 on which a first elastic member according to another embodiment is provided.
Figure 17:
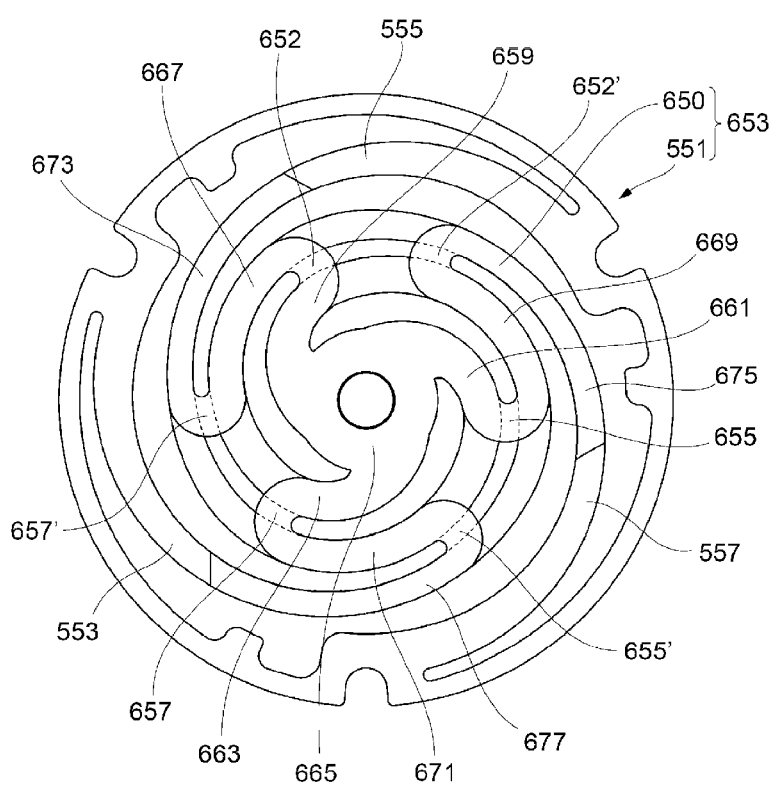
FIG. 17 is a top view of the first damper unit of FIG. 16.

(1) As the elastic member, those shown in FIGS. 16 and 17 may be used. FIG. 16 is a perspective view of a first damper unit including the first damper of FIG. 1 on which a first elastic member according to another embodiment is provided. FIG. 17 is a top view of the first damper unit of FIG. 16.

A first damper unit 653 and a second damper unit 853 according to the other embodiment will be described. Since the first damper unit 653 and the second damper unit 853 are in the same shape and attaching manner to the case 1 is also the same, the first damper unit 653 will be described here, and the description of the second damper unit 853 will be omitted. Then, the same portion of the second damper unit 853 as the first damper unit 653 are labeled with reference numerals obtained by adding 200 to the reference numerals of the corresponding components of the first damper unit 653. For example, when a first arm of the first damper 551 of the first damper unit 653 is labeled with reference numeral 553, the reference numeral of a first arm of a second damper 751 of the second damper unit 853 is 753.

Further, since the first damper 551 and the second damper 751 are in the same shapes as the first damper 51 and the second damper 251 described above, the redundant description will be omitted.

A first elastic member 650, which is the other one of the two components constituting the first damper unit 653, has bridges that bridge the adjacent arms of the first damper 551. Specifically, first bridges 652 and 652' bridge the first arms 553 and the third arm 557 of the first damper 551, second bridges 655 and 655' bridge the second arm 555 and the first arm 553, third bridges 657 and 657' bridge the third arm 557 and the second arm 555.

Accordingly, t the first arms 553 and the third arm 557 are bridged at two locations, namely, the first bridge 652 and the first bridge 652'. The second arm 555 and the first arm 553 are bridged at two locations, namely, the second bridge 655 and the second bridge 655'. The third arm 557 and the second arm 555 are bridged at two locations, namely, the third bridge 657 and the third bridge 657'.

Further, the first elastic member 650 has a first support-direction stacked arm 659 toward a support that is connected to the first bridge 652, extends along the first arm 553, is overlapped with the first arm 553, and extends in a support 551*b* direction. The first elastic member has a second support-direction stacked arm 661 that is connected to the second bridge 655, extends along the second arm 555, is overlapped with the second arm 555, and extends in the support 551*b* direction. The first elastic member has a third support-direction stacked arm 663 that is connected to the third bridge 657, extends along the third arm 557, is overlapped with the third arm 557, and extends in the support 551*b* direction.

Then, the first elastic member 650 includes a stacked support 665 overlapped with the support 551*b* of the first damper 551 in which the first support-direction stacked arm 659, the second support-direction stacked arm 661, and third support-direction stacked arm 663 are continuously provided.

In addition, in the first bridge 652, a first intermediate stacked arm 667 overlapped with the third arm 557 and connected to the third bridge 657' is continuously provided. In the second bridge 655, a second intermediate stacked arm 669 overlapped with the first arm 553 and connected to the first bridge 652' is continuously provided. In the third bridge 657, a third intermediate stacked arm 671 overlapped with the second arm 555 and connected to the second bridge 655' is continuously provided.

Further, in the third bridge 657', a first annular-frame-direction stacked arm 673 overlapped with the second arm 555 and extends in an annular frame 551c direction is continuously provided. In the first bridge 652', a second annular-frame-direction stacked arm 675 overlapped with the third arm 557 and extends in the annular frame 551c direction is continuously provided. In the second bridge 655', a third annular-frame-direction stacked arm 677 overlapped with the first arm 553 and extends in the annular frame 551c direction is continuously provided.

The second elastic member 850 also has this configuration.

Figure 18:
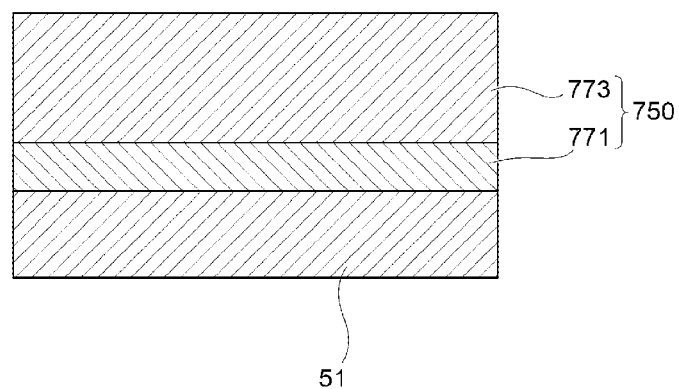
FIG. 18 is a configuration diagram illustrating another structure of the first elastic member of FIG. 1.

(2) The structure of the first elastic member and the second elastic member may be the structure shown in FIG. 18. Although the description will be given with the first elastic member, the second elastic member may also have such a structure.

FIG. 18 is a configuration diagram illustrating another structure of the first elastic member of FIG. 1.

As shown in FIG. 18, a first elastic member 750 includes an adhesive layer 771 made of an adhesive and a PE layer 773 made of polyethylene (PE) that are stacked on the first damper 51. The elastic deformation of the first elastic member 750 (i.e., the shear deformation of the PE layer 773 in this embodiment) controls the oscillation of the first damper 51.

Figure 19:
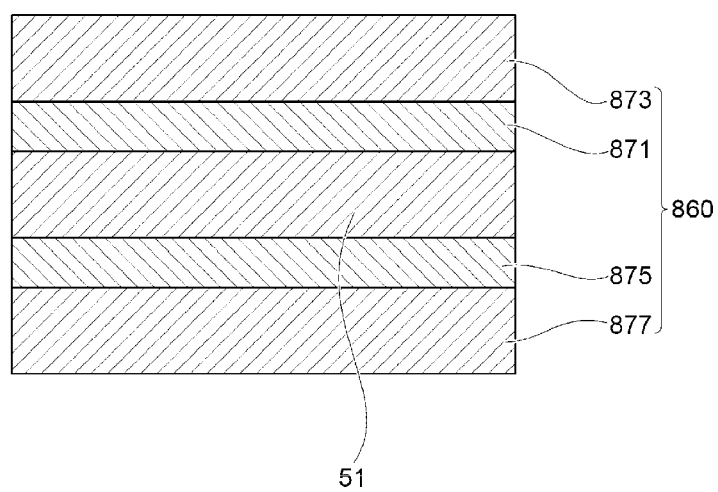
FIG. 19 is a configuration diagram illustrating another structure of the first elastic member of FIG. 1.

(3) The structure of the first elastic member and the second elastic member may be the structure shown in FIG. 19. Although the description will be given with the first elastic member, the second elastic member may also have such a structure.

FIG. 19 is a configuration diagram illustrating another structure of the first elastic member of FIG. 1.

As shown in FIG. 19, a first elastic member 860 includes a first adhesive layer 871 made of an adhesive and a first PE layer 873 made of polyethylene (PE) that are stacked on one surface of the first damper 51, and a second adhesive layer 875 made of an adhesive and a second PE layer 877 made of polyethylene (PE) that are stacked on the other surface of the first damper 51. Then, the elastic deformations of the first elastic member 860 (i.e., the shear deformations of the first PE layers 873 and second PE layer 877 in this embodiment) control the oscillation of the first damper 51.

Figure 20:
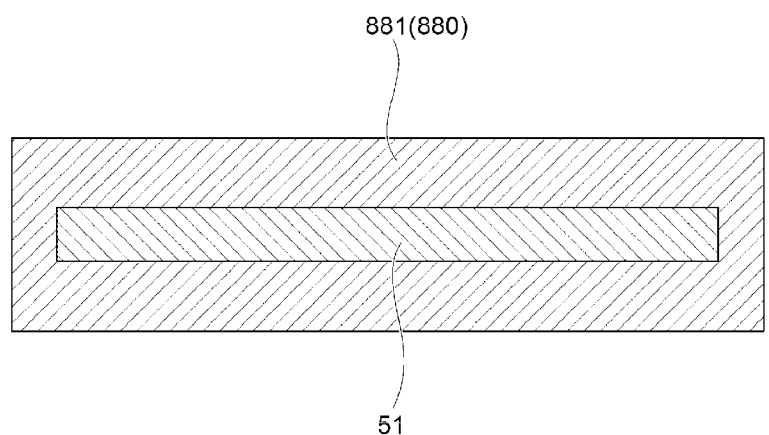
FIG. 20 is a configuration diagram illustrating another structure of the first elastic member of FIG. 1.

(4) The structure of the first elastic member and the second elastic member may be the structure shown in FIG. 20. Although the description will be given with the first elastic member, the second elastic member may also have such a structure.

FIG. 20 is a configuration diagram illustrating another structure of the first elastic member of FIG. 1.

As shown in FIG. 20, the first elastic member 880 is an elastomer layer 881 formed on the first damper 51 by insert molding method.

The, the elastic deformation of the first elastic member 880 (i.e., the bending deformation of the elastomer layer 881 in this embodiment) controls the oscillation of the first damper 51.

Figure 21:
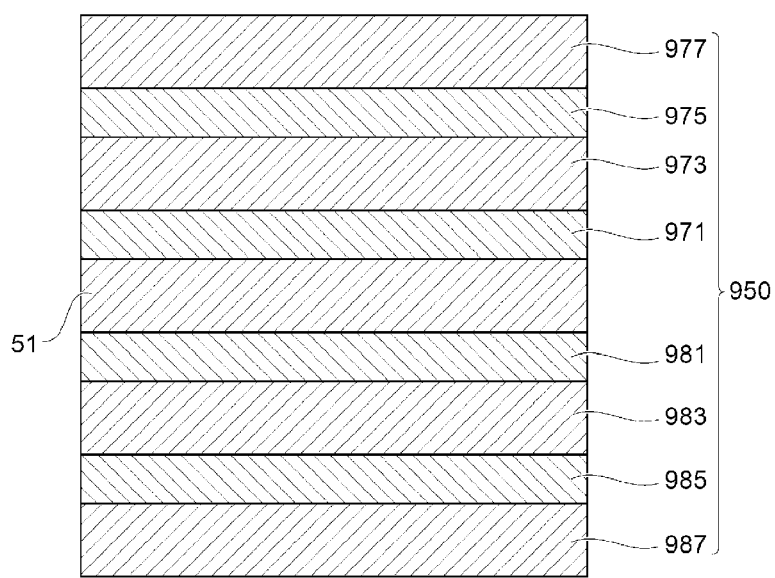
FIG. 21 is a configuration diagram illustrating another structure of the first elastic member of FIG. 1.

(5) The structure of the first elastic member and the second elastic member may be the structure shown in FIG. 21. Although the description will be given with the first elastic member, the second elastic member may also have such a structure.

FIG. 21 is a configuration diagram illustrating another structure of the first elastic member of FIG. 1.

As shown in FIG. 21, a first elastic member 950 includes a first adhesive layer 971 made of an adhesive, a first PE layer 973 made of polyethylene (PE), a second adhesive layer 975 made of an adhesive, and a first elastomer layer 977 made of an elastomer that are stacked on one surface of the first damper 51, and a third adhesive layer 981 made of an adhesive, a second PE layer 983 made of polyethylene (PE), a fourth adhesive layer 985 made of an adhesive, and a second elastomer layer 987 made of an elastomer that are stacked on the other surface of the first damper 51. Then, the elastic deformations of the first elastic member 950 (i.e., the shear deformations of the first PE layer 973 and the second PE layer 983 and the bending deformations of the first elastomer layer 977 and second elastomer layer 987 in this embodiment) control the oscillation of the first damper 51.

(6) Although the case 1 has the cylindrical shape, the shape is not limited to the cylinder and may be a square tubular shape, for example, as long as it is a tubular shape.

EXAMPLE

Figure 22:
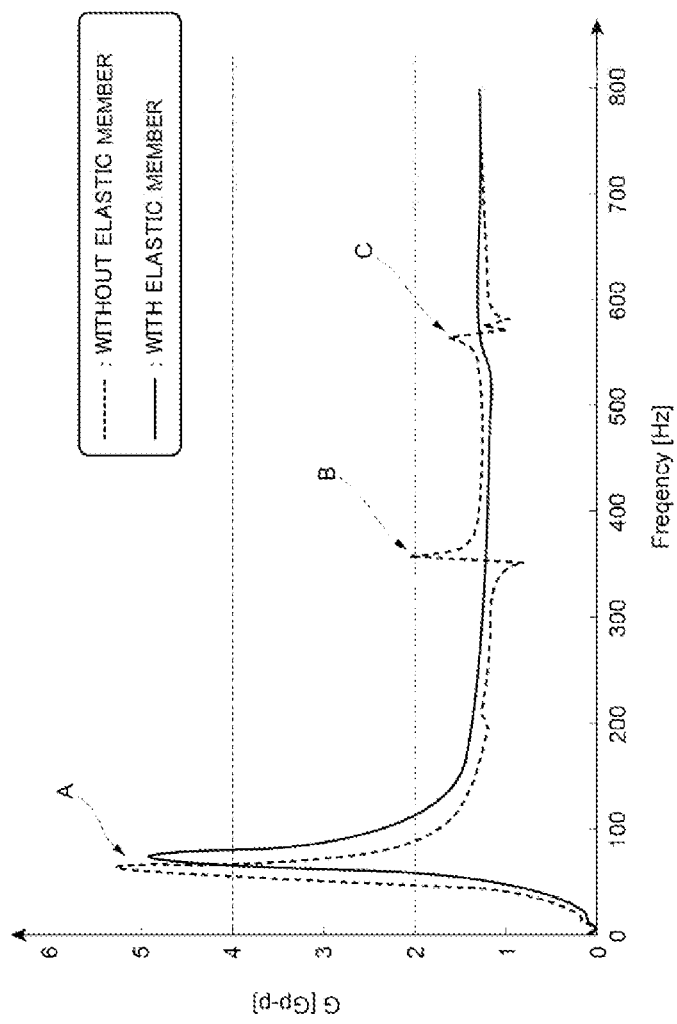
FIG. 22 illustrates an example.

In order to confirm the effect of the present invention, the applicant examined the relationship, by using an acceleration detector and an FFT analyzer, between the frequency (Frequency [Hz]) and the acceleration (G [Gp-p]) of an oscillatory actuator corresponding to the conventional example using dampers without any elastic member and the oscillatory actuator 10 shown in FIGS. 1 to 12 using damper units including the elastic members and the dampers. FIG. 22 shows the results.

Note that the unit Gp-p is the value obtained by dividing the acceleration ($m/s^2$) obtained by the FFT analyzer by 9.8 ($m/s^2$) and multiplying by $2\sqrt{2}$.

It is found that without any elastic member as indicated by the broken line, resonance (see the part B) occurs due to the torsion of the first damper and second damper, but that when the first damper unit and second damper unit including the elastic members and the dampers are used as indicated by the solid line, the torsional resonance is suppressed.

Further, at the natural resonance frequency (see the part A), influence on the amplitude, which is obtained by integrating the acceleration twice, is small, and sufficient oscillation outputs are obtained.

Next, it is also found that without any elastic member as indicated by the broken line, resonance (see the part C) of the each arm itself of the first damper and second damper occurs, but that when the first damper unit and second damper unit including the elastic members and the dampers are used as indicated by the solid line, the resonance of each arm itself of the first damper and the second damper is suppressed.

The invention claimed is:

1. An oscillatory actuator comprising:
a case in a cylindrical shape;
an electromagnetic driver provided inside the case;
a mover oscillated by the electromagnetic driver along an oscillation axis of the case; and
a first leaf spring and a second leaf spring arranged on one side and the other side with the mover interposed therebetween, each of the first leaf spring and the second leaf spring including a support to which the mover is attached, an annular frame attached to an inner surface of the case, and a plurality of arms each having a spiral shape and connecting the support and the annular frame,
wherein at least one of the first leaf spring and the second leaf spring is provided with an elastic member which is made of an elastic material that bridges the min and a portion adjacent to the arm;

wherein a gap is presented between the arm and the portion adjacent to the arm in a surface direction of at least one of the first leaf spring and the second leaf spring; and the elastic member is positioned at at least a portion of the gap.

2. The oscillatory actuator according to claim 1, wherein the plurality of arms includes three arms each having the same spiral shape, and the elastic member is provided on each of the plurality of arms.

3. The oscillatory actuator according to claim 1, wherein the elastic member is provided at least on a side of the first leaf spring and the second leaf spring opposite to a side on which the mover is attached.

4. The oscillatory actuator according to claim 1, wherein the elastic material is provided so as to bridge the arm of at least one of the first leaf spring and the second leaf spring and a portion having an amount of displacement difference from the arm when the mover vibrates.

5. The oscillatory actuator according to claim 1, wherein the elastic member is provided so as to bridge an intermediate portion of the spiral shape of the plurality of arms and a portion adjacent to the intermediate portion with a gap.

6. The oscillatory actuator according to claim 1, wherein each annular frame of the first leaf spring and the second leaf spring is formed with a cutout at a same position of each of the annular frame of the first leaf and the second leaf as an attachment to the case.

\* \* \* \* \*